April 28, 1970  L. GILDEN ET AL  3,508,349
EDUCATIONAL DEVICE
Filed Dec. 1, 1967

INVENTORS
LLOYD GILDEN
CHESTER FREEMAN, JR.

United States Patent Office 3,508,349
Patented Apr. 28, 1970

3,508,349
EDUCATIONAL DEVICE
Lloyd Gilden, 53 Clock Tower, Old Westbury, N.Y.
11568, and Chester Freeman, Jr., 14 Beekman
Ave., Mount Vernon, N.Y. 11153
Filed Dec. 1, 1967, Ser. No. 687,224
Int. Cl. G09b 5/02
U.S. Cl. 35—35                                          8 Claims

ABSTRACT OF THE DISCLOSURE

A device for teaching children how to spell and identify letters comprises a housing having a keyboard, the keys of which control a display circuit within the housing. A program card containing a word to be spelled can be inserted into the housing to program the display circuit such that an indication will be provided when the child pushes, in the proper sequence, the keys corresponding to the word displayed on the program card.

---

The present invention relates to a device which is intended to teach children between the ages of two and seven to identify different leters and to learn to spell simple, basic words.

Young children generally experience difficulty in identifying the various letters of the alphabet. For example, a child seeing the letter "C" might not be able to select another letter "C" from a group of letters because of his inability to compare and identify the respective letters.

The present invention provides a device which is principally educational in character in that it teaches young children to identify the letters of the alphabet and to spell simple basic words in a way which is interesting and appealing to children. Although essentially the invention is intended for educational purposes, children in general find operation of the device so interesting that the invention may also be considered a toy to be used for amusement purposes. Indeed, the fact that the invention is educational while at the same time interesting and amusing, is one of its outstanding characteristics.

In the broad field to which the invention petrains, there are known mechanical or mechanical-electrical devices which are intended to teach children how to spell and identify the letters of the alphabet. A typical device of this nature is shown in Patent No. 3,318,023 of Myers. Such devices, as would be expected, provide an indication when the user has correctly spelled a particular word. The present invention operates in accordance with similar principles but is an improvement over the prior art devices in regard to the manner in which that indication is given, and the fact that it can be programmed for use with an extremely wide variety of basic words, yet still provide an indication of successful operation only if the letters corresponding to a particular word are formed in a correct sequence.

Briefly, in accordance with the invention an electric display circuit is contained in a housing containing a keyboard the keys of which correspond to the vowels and certain consonants of the alphabet. The display circuit includes switch means which are responsive to the keys, and the circuit is programmed by a card which is inserted into the housing. The card contains a picture of an object and/ or the word which is to be spelled by the user and programs the switch means display of the circuit such that when the keys corresponding to the displayed word or object are pressed in correct sequence, an indication is given.

Figure 1:
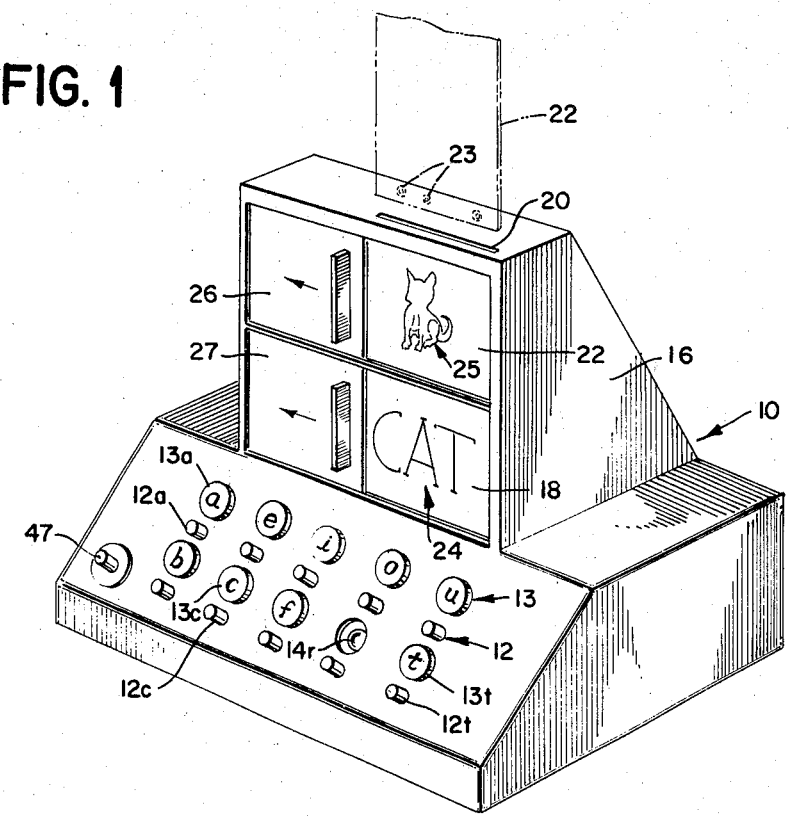
Figure 2:
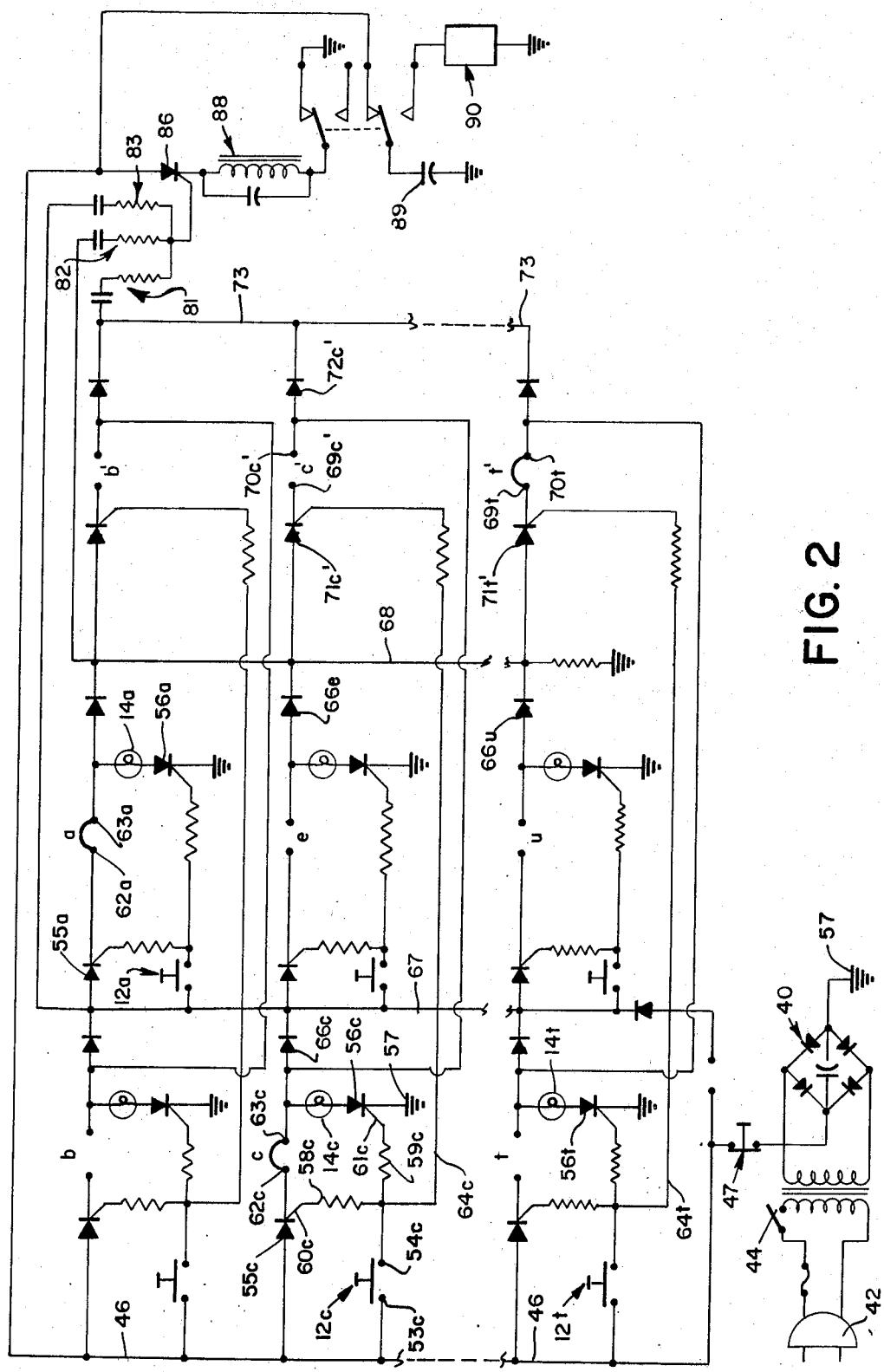

In the drawings:
FIGURE 1 is a perspective view of the exterior of an educational toy device according to the invention; and FIGURE 2 is a circuit diagram of the display circuit with in the housing of FIGURE 1.

In FIGURE 1, the housing is shown generally at 10. An electrical display circuit is contained in the housing 10, and is controlled by means of a plurality of keys 12 arranged in a keyboard on an exterior surface of the housing 10. A shown in FIG. 1, there are five keys 12 corresponding to the vowels, a,e, i, o and u as indicated thereon arranged in a top row and 5 keys 12 corresponding to the consonants b, c, f, r and t arranged in a bottom row. Obviously, the invention is not limited to any number of vowels and/or consonants, and any desired arrangement or number thereof may be employed within the scope of the invention. It is preferred, however, to use a limited number of keys which simplifies operation of the device and helps to hold the interest of younger children although reducing the number of words which can be spelled.

Above each of the keys 12, there is positioned a translucent cover 13 on which is inscribed one of the letters. Beneath each cover 13 and suitably mounted in housing 10 is an indicator lamp 14 which is energized when the corresponding key is pressed in a predetermined sequence with regard to the remaining keys as explained in greater detail below.

The housing 10 includes an upstanding portion 16 which contains a window 18 and a slot 20 for receiving a coded member such as program card 22. Card 22 is coded by suitably positioned contacts 23 in the bottom of the card, as explained below. Program card 22 contains a legend 24, for example "cat" and a picture 25 of a cat representing the word to be spelled by the user. Sliding doors 26 and 27 may be used to selectively cover the legend 24 or picture 25.

When card 22 is fully inserted into the housing portion 16, the word 24 and/or picture 25 will be displayed in housing window 18. Although the display of the actual word to be spelled may appear unusual, in the case of very young children identification of the letters displayed on the covers 13 with the letters displayed in window 18 is challenging and intriguing particularly where, as explained below, identification must be made in a particular sequence to activate the display. For older or more advanced children, the picture 25 of the item to be spelled may be displayed in place of the word "cat" so that the child can learn to spell common or basic words. At any rate, what is displayed on card 22 within window 18 is not material to the present invention.

As will become apparent from the description of the circuit, the contacts 23 permit certain contact terminals to be closed when the card 22 is inserted into a suitable receiving member of the type for example made by Amphenol Corporation and sold as a thirty pin connector.

Before proceeding to a description of the actual display circuit, a brief discussion of the functional operation of the device shown in FIGURE 1 is presented.

Continuing with the selected example, a child has inserted the selected program card 22 into slot 20 so that the word "cat" is displayed within window 18. If a child presses the key 12c, lamp 14c (not shown) will be energized and observed through the cover 13c indicating that he has depressed the correct key. If any other key, including keys 12a and 12t had been depressed, no indication would have been given. Then the child must press the key 12a in which case the lamp 14a (not shown) is energized to indicate that the keys have been pressed in the correct sequence. Finally, when key 12t is depressed the lamp 14t is energized and, at the same time, a bell may be sounded to indicate that the word has been correctly spelled.

FIGURE 2 illustrates the actual display circuit within housing 10. In the following description, because of the substantial repetition of circuit elements, those elements corresponding to a single letter of the keyboard are designated by the corresponding letter. Any elements so identified will have a corresponding counter-part as to each of the remaining letters. In other words, contact 40a refers to a portion of the circuit relating to selection of the letter "a" and there will be a corresponding contact 40 for each of the letters e, i, o, u, b, c, f, r, and t. Also to avoid undue complexity, the circuit of FIGURE 2 is explained partially with reference to the selected example of FIGURE 1, and only those parts to which reference is made are actually labelled on the drawing. The circuit includes a standard full wave power supply 40 which may be coupled directly to a conventional 110 volt AC supply from a standard outlet by means of a wall plug 42. An on-off switch 44 may be located on the exterior of the housing for the purpose of applying an operating voltage to the circuit.

The output of the power supply 40 is applied to a line 46 through a normally closed reset switch 47. The switches 12 are all identical and the connection with their respective lamps 14 and program switch terminals are the same. Thus, switch 12c includes a push button 49c adapted to close a circuit across a pair of terminals 53c and 54c. A pair of silicon controlled rectifiers (SCR's) 55c and 56c are connected between the positive line 46 and the negative side 57 of the power supply 40. Voltage dropping resistors 58c and 59c are connected between terminal 54c and the control electrodes 60c and 61c of respective SCR's 55c and 56c. A pair of program terminals 62c and 63c are placed between the SCR's 55c and 56c and the display lamp 14c is connected in series between the anode of SCR 56c and program terminal 63c. Finally the circuit includes blocking diode 66c.

Each of the remaining consonants b, r, f, and t has an identical display circuit and the consonant display circuits are all connected in parallel between the power supply line 46 and a first common bus 67. Each of the vowels a, e, i, o, and u, also has a display circuit comprising the same elements as described above with respect to the letter "C" and these display circuits are all connected in parallel between the first common bus 67 and a second common bus 68. Display circuits for the vowels however, do not include the program terminals 64c and 65c.

A third circuit, associated with the consonants b, c, f, r, and t, corresponds to the third letter, for example, of a three letter word and therefore are differentiated by a prime mark (') to distinguish it from the circuit principally associated with the first letter. It includes a pair of normally opened program terminals 69c' and 70c', and an SCR 71c' connected in series with the program terminals 69c' and 70c, diode 72c' is connected between program terminal 70c' and a third common line 73.

The circuit thus comprises three series connected circuits, each of which comprises a plurality of parallel connected gating circuits associated in sequence with the letters of the words to be spelled.

The circuit is programmed in the following manner. The respective program terminals 62 and 63, and 69 and 70 are normally open, but insertion of the program which contains a plurality of contacts 23, will establish a connection where the contacts are present. For example, in the example discussed with reference to FIGURE 1, (where the word "cat" is displayed) the program terminals 62c and 63c are in electrical contact, the terminals 62a and 63a are in electrical contact, and terminals 69t and 70t are in electrical contact. These electrical connections through the program card are shown by heavy black lines between the above mentioned program terminals. Thus, with reference to the specific example the word "cat" is to be formed, the program card 22 will cause the circuit to appear as illustrated in FIGURE 2. The operation of the circuit is as follows:

When the user presses the key 12c, SCR's 55c and 56c are pulsed into conduction by application of the positive voltage on line 46 to the SCR gates, 60c and 61c. Conducition of SCR's 55c and 56c energizes the lamp 14c through terminals 62c and 63c to indicate that the key corresponding to the letter "C" has been depressed. If any of the remaining keys 12 are depressed, none of the corresponding display lamps will be lit because (with the exception of the letter "a") none of the program terminals 62, 63 is closed. If switch 12a is closed, there is no effect on lamp 14a (if switch 12c has not been closed) because the high voltage on line 46 cannot be applied to the line 67 by virtue of the non-conducting SCR's 55b, c, f, r, t. Hence only lamp 14c can be energized when the key 12c is actuated. Switches 12 may be returned to an open condition since the SCR's will continue to conduct after the energizing voltage has been removed.

As soon as the key 12c is depressed, the high voltage on line 46 is applied to the line 67. Thus, when the key 12a is depressed, the SCR's 55a and 56a are caused to conduct thereby energizing lamp 14a and the second common line 68. Actuation of a key 12 corresponding to any of the remaining vowels will not energize any of the lamps, since all of the remaining vowel program terminals 62, 63 are open. As for the consonants, closure of any of the switches 12b, f, r, t cannot energize any of the corresponding lamps 14 because the diodes 56b, f, r, t respectively, prevent application of the high voltage on line 67 to the respective lamps 14. Hence, when a circuit has been programmed as shown, the keys corresponding to the letters "c" and "a" must be actuated in that sequence to light the respective lamps 14c and 14a.

After keys 12c and 12a have been depressed, lamp 14t can be energized by closure of switch 12t through a circuit which can be traced from the high voltage appearing on line 68 (from line 46 through SCR's 55c and 55a) through SCR 71t' and SCR 56t. SCR's 56t and 71t conduct because of the application of the positive voltage on line 46 to their respective control electrodes by closure of switch 12t. Actuation of any of the remaining keys 12b, f, r, will not energize a lamp, since the corresponding SCR's 56 and 71 will not be conducting. Actuation of any of the keys 12e, i, o, u, will not energize any of the lamps because the diodes 66e, i, o, u prevent application of the positive voltage on line 68 to the lamps 14e, i, o, u.

If an audio indication is also desired, the lines 67, 68, and 73 may be connected to respective RC circuits 81, 82 and 83 in the control circuit of an SCR 86, which, when caused to conduct by a signal on any of these lines will energize a relay 88. The contacts of relay 88, when operated, cause a capacitor 89 to discharge through a bell 90 to provide a brief audible ring. If desired, the circuit may be modified in an obvious way to energize bell 90 only when a signal appears on all three lines 67, 68, 73 (i.e. when the word has been properly spelled).

From the foregoing description it should be apparent how the circuit is programmed to spell any combination of words comprising consonant, vowel, and consonant (different from the first consonant). By way of summary, the following rules should be observed in the case of a three-letter word: program terminals 62, 63 corresponding to the first consonant should be connected together; program terminals 62, 63 corresponding to the selected vowel should be connected together; and program terminals 69, 70 corresponding to the last consonant should be connected together. In this fashion, a wide selection of words can be programmed providing sufficient variety with merely ten keys and three-lettered words to interest and educate a young child.

Obviously numerous modifications of the illustrated embodiment may be made within the scope of the invention. Of course, the invention is not limited to the specific circuit and clearly more or less sophisticated logic circuits, such as mechanical switches and diodes could be used to permit the formation of longer or shorter words (including a single letter) or to provide the desired indications in different fashions. The type of indicia employed is not material and obviously the principals of the invention could be used with mathematical or other symbols in place of letters. It is also obvious that the invention is not in any way dependent upon the number of keys or letter employed. The display lamps and keys may be combined into a single unit, and it is also possible to make removable covers 13 such that the illustrated consonants can be replaced with different covers identifying different consonants. Also, of course, each of the five illustrated consonant keys could represent a plurality of consonants so as to increase the number of words which can be spelled.

What is claimed is:
1. A device of the class described comprising,
a housing,
an electrical circuit within said housing and including a plurality of switches, each of said switches including a manually operable actuator in the form of a keyboard accessible from the exterior of said housing, each of said switches being associated with a preselected indicium,
a plurality of indicator means associated with respective ones of said switches,
circuit means for connecting at least a preselected one of said switches and indicator means in circuit with a voltage source whereby the indicator means associated with said one switch can be energized when said one switch is actuated, and
program means responsive to a coded member for enabling a circuit to said voltage source including a sequence of preselected ones of said switches, said circuit adapted to energize the indicator means associated with said preselected switches when their actuators are operated pursuant to said sequence only.

2. A device according to claim 1, wherein said housing is adapted to physically receive said coded member and said program means comprises a plurality of additional switch means connected in said circuit with said preselected switches and indicator means, at least one of said additional switch means being actuable by said coded member.

3. A device according to claim 2, wherein respective ones of said additional switch means are connected in series with each of said switches.

4. A device according to claim 3, wherein said switches are arranged in at least two groups, said preselected switches including a switch from each group, the switches in each group being connected together in parallel and said groups being connected in series.

5. A device according to claim 4, wherein each of said indicator means comprises a lamp mounted on the exterior of said housing in proximity to the actuator of its associated switch.

6. A device according to claim 5, wherein said circuit means connects at least two switches from one of said groups and one switch from the other of the groups in circuit with said voltage source.

7. A device according to claim 1, wherein said coded member contains indicia representative of said predetermined sequence.

8. A device according to claim 6, wherein said coded member contains indicia representative of said predetermined sequence.

References Cited

UNITED STATES PATENTS 3,015,895  1/1962  Stall.
3,146,534  9/1964  Brown et al.
3,346,968  10/1967  Dellinger _____ 35—6

EUGENE R. CAPOZIO, Primary Examiner
W. H. GRIEB, Assistant Examiner

U.S. Cl. X.R.
35—9